United States Patent Office 2,863,883
Patented Dec. 9, 1958

2,863,883

ANTHRAQUINONE CHLOROALDAZINES AND PRODUCTION THEREOF

Erwin Klingsberg, Mountainside, N. J., assignor to American Cyanamid Company, New York, N. Y., a corporation of Maine No Drawing. Application November 18, 1957
Serial No. 696,908

12 Claims. (Cl. 260—367)

This invention relates to new processsse for the preparation of chloroaldazines of the anthraquinone series, and to the chloroaldazines thus prepared. More specifically, it relates (1) to a process of chlorinating a 2-anthraquinonyl aldazine at elevated temperatures in nitrobenzene, (2) to a process of reacting diacyl hydrazines of the 2-anthraquinonyl series with phosphorus pentachloride and (3) to new mono- and dichloraldazines of the structure:

in which X and Y may be hydrogen or chlorine, at least one being chlorine, and R and R' are aryl, at least one one which is a 2-anthraquinonyl radical.

Aldazines of the benzene series, in which the side chain hydrogens have been replaced by chlorine, are known. Anthraquinonyl aldazines with chlorine substituents in the side chain have not heretofore been prepared. It has now been found that preparation of such compounds of the anthraquinone series can be carried out under very specific and critical conditions, and that such compounds are intermediates for the preparation of vat dyes.

I have found that dianthraquinonyl aldazines can be reacted with chlorinating agents in nitrobenzene solution at temperatures greater than 60° C., when the anthraquinonyl radicals are free of amino and hydroxy groups, to produce the corresponding mono-chloroaldazines. The reaction can be illustrated by the following equation using 2-anthraquinonyl aldazine:

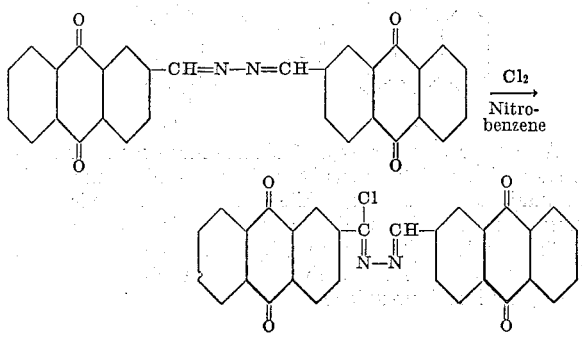

I have further found that diacyl hydrazines can be reacted with phosphorus pentachloride at temperatures greater than 100° C., to give dichloroazines. Such diacyl hydrazines may be symmetrical dianthraquinonyl carboxyl hydrazines or may be and usually are, unsymmetrical anthraquinonyl carboxyl aroyl hydrazines. This preparation may be illustrated by the following equation; using N-(2-anthraquinonylcarbonyl)-N'-benzoyl hydrazine as an example:

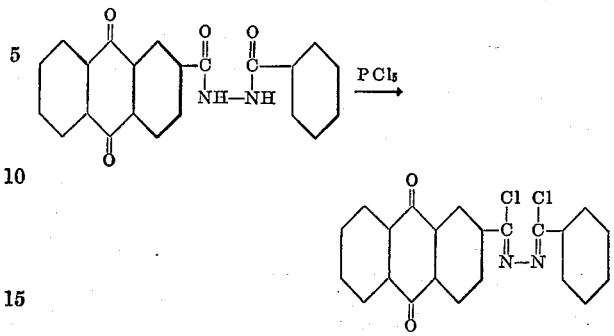

I have further found that the new compounds of the structure:

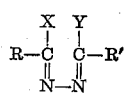

in which X and Y are hydrogen or chlorine, at least one being chlorine, and R and R' are aryl, at least one being 2-anthraquinonyl, are intermediates for new vat dyes.

In the reaction of the 2-anthraquinonyl aldazines with chlorine in nitrobenzene, the conditions are very critical. Nitrobenzene must be used as a reaction medium, since a change of solvent results in an entirely different reaction. For example, a chlorinated solvent, such as o-dichlorobenzene, gives an anthraquinonyl nitrile instead of a chloroazine. The temperature must be maintained over 60° C., and preferably in the range of 75–120° C. in order to obtain an effective reaction. Higher temperatures will also tend to cause decomposition of the azine. The anthraquinone radicals cannot carry an amino or a hydroxy substituent, since their presence causes chlorination in the ring instead of in the side chain.

This method is the one used for the preparation of monochloroazines, although they conceivably could be prepared by the reaction of an aroyl arylhydrazone with $PCl_5$. In my process for monochloroazines, the chlorinating agent is preferably chlorine, although other chlorinating agents such as sulfuryl chloride can be used.

The preparation of chloroaldazines from the diacylhydrazines specifically requires the use of phosphorus pentachloride. The use of another chlorinating agent such as thionyl chloride causes the formation of an oxadiazole. In the benzene series, phosphorus pentachloride gives oxadiazole mixed with the chloroazine.

The aryl group on the chlorinated aldazines of my invention and, consequently, in the aldazines or acyl hydrazines in the processes of my invention, must include at least one 2-anthraquinonyl radical. Such a 2-anthraquinonyl radical may be 2-anthraquinonyl, 1-chloro-2-anthraquinonyl, 1-nitro-2-anthraquinonyl, 1-amino-2-anthraquinonyl, 5-amino-1-anthraquinonyl, 4-bromo-1-amino-2-anthraquinonyl, 5,8-dichloro-2-anthraquinonyl, 3-bromo-2-anthraquinonyl, 5-nitro-2-anthraquinonyl, and the like.

The aryl group, when not an anthraquinonyl, may be a phenyl; a substituted phenyl, such as methoxy phenyl, ethoxy phenyl, dimethoxy phenyl; alkyl phenyl such as ethyl phenyl; halogenated phenyl such as chlorophenyl, dichlorophenyl, bromophenyl, trifluoromethyl phenyl and other substituted phenyls such as methyl sulfonyl phenyl, nitro phenyl, and the like; naphthyl, substituted naphthyl such as chloronaphthyl, methyl naphthyl, methoxy naphthyl, and the like; pyridyl, thienyl, and the like.

The compounds of my invention include both the mono and the dichloro aldazines. The dichloro compounds are prepared usually by the second process, that is, from the diacyl hydrazines, whereas the mono chloro aldazines are prepared from the aldazines by the first process. The compounds also include those in which the aryl groups are either the same or different, although in general, because of the greater ease in obtaining intermediates, the latter compounds are more readily prepared by the second process from the diacyl hydrazines. Both processes may be used to prepare the compounds in which both aryl groups are the same anthraquinonyl.

The compounds of my invention are useful as intermediates for the preparation of vat dyes. Both the mono- and dichlorcaldazines may be reacted with aryl amines to form 1,2,4-triazoles, carrying anthraquinone substituents. Nuclear chloro or nitro groups are then convertible to amino groups and the amino anthraquinonyl 1,2,4-triazole derivatives are vat dyes. When the amino group is not in the 1 position of the 2-anthraquinonyl residue, it may be condensed with a chloro anthraquinone to form an anthrimide, which may be carbazolized or it may be condensed with ortho chloro carboxylic acids in the well known reaction to form acridones. The preparation of such intermediates and dyes can be illustrated by the following equations:

(1)
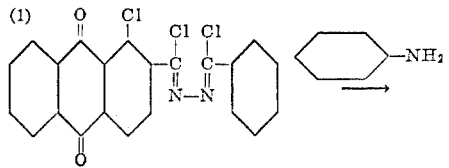
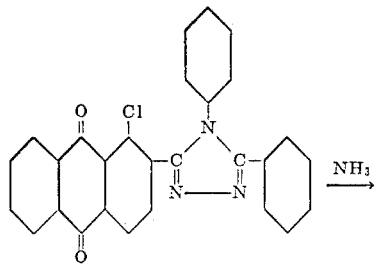
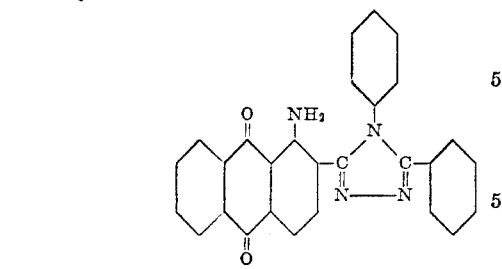

(2)
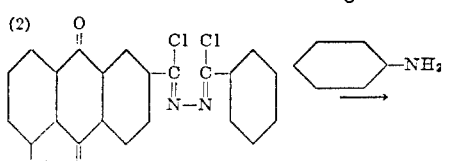
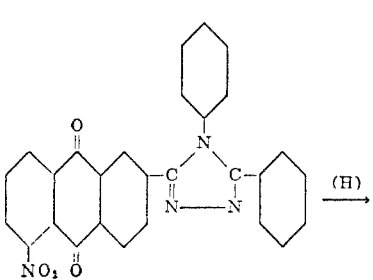

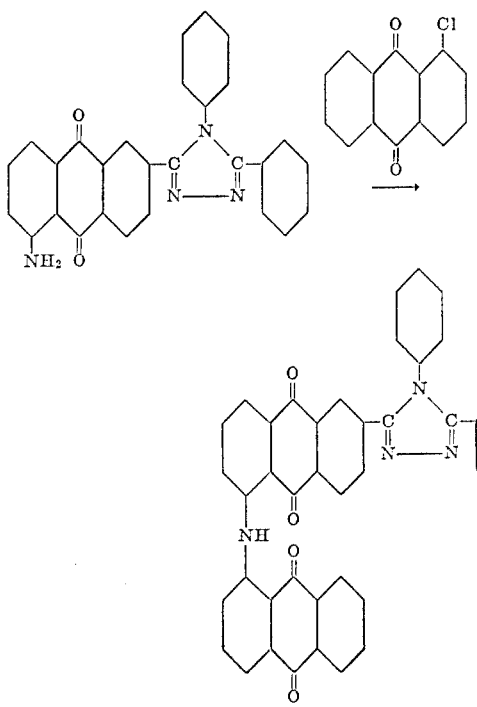

The final product of the synthesis illustrated is a red vat dye of the type claimed in my copending application Serial No. 696,906, filed November 18, 1957.

My invention can be illustrated by the following examples in which parts are by weight unless otherwise illustrated.

*Example 1*

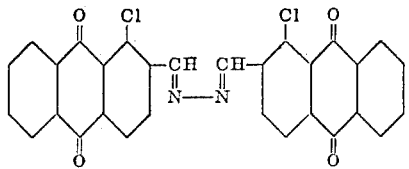

A solution of 11 parts of 1-chloro-2-anthraquinonecarboxaldehyde in 600 parts by volume of glacial acetic acid is stirred at reflux while a solution of 1.5 parts by volume of 85% hydrazine hydrate in 20 parts by volume of acetic acid is added gradually. The reaction mixture is stirred at reflux until the reaction is complete. The product is filtered hot and washed with ethanol.

*Example 2*

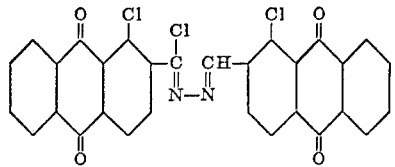

A mixture of 0.7 part of 1-chloro-2-anthraquinonecarboxaldazine and 20 parts by volume of nitrobenzene is maintained at 95° C., while subjected to a vigorous stream of chlorine until the reaction is complete. It is then cooled, diluted with a little benzene and filtered. The product is washed with benzene and dried. It may be crystallized from xylene.

*Example 3*

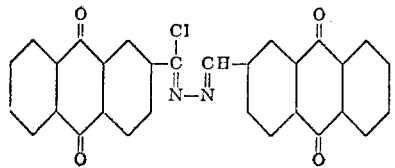

A mixture of 5.0 parts of 2-anthraquinonecarboxaldehyde azine and 200 parts by volume of nitrobenzene is heated at 100–115° C., while a stream of chlorine is passed through it. When the reaction is complete, the mixture is cooled and the product is isolated by filtration. It may be recrystallized from monochlorobenzene.

*Example 4*

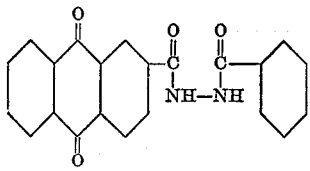

Anthraquinone-2-carboxy chloride (10 parts) is dissolved in 200 parts by volume of refluxing xylene, with efficient stirring. A solution of 7.0 parts of benzhydrazide in 50 parts by volume of boiling xylene is added, with the immediate formation of the product. The reaction mixture is then cooled, filtered and the product washed with benzene and dried. It is purified by crystallization from boiling carbitol.

*Example 5*

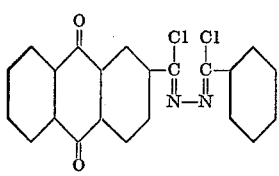

A mixture of 3.0 parts of the product of Example 4 and 8.0 parts of phosphorus pentachloride are ground up and heated to 145° C. The mixture is stirred until the reaction is complete. It is then cooled, triturated with a small amount of benzene and filtered. The isolated product may be crystallized from toluene.

When this compound is reacted with aniline the triazole, 3-(2-anthraquinonyl)-4,5-diphenyl-1,2,4-triazole is formed.

*Example 6*

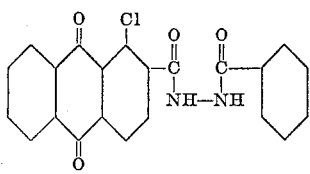

1-chloro-2-anthraquinonecarbonyl chloride, 25.0 parts, is dissolved in 500 parts by volume of refluxing xylene and stirred while a solution of 12 parts of benzhydrazide in 500 parts by volume of hot xylene are added. The reaction is heated at reflux with stirring until complete. It is then cooled and filtered and the product washed with benzene. The product is then recrystallized from 2000 parts of methyl Cellosolve.

By using equivalent quantities of p-methoxybenzhydrazide, p-toluoylhydrazide, m-trifluoromethylbenzhydrazide, and 2,4-dichlorobenzhydrazide, in place of the benzhydrazide, there are obtained the correspondingly substituted products. Similarly, by using 2-naphthoylhydrazide, nicotinoylhydrazide, or thenoylhydrazide, there is obtained the product with that ring system replacing the phenyl group.

*Example 7*

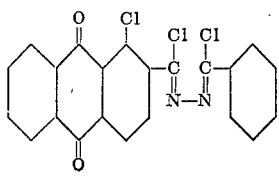

This compound may be prepared by reacting the product of Example 6 with phosphorus pentachloride, using the method of Example 5. The substituted products of Example 6, when used in place of the unsubstituted phenyl compound, gives the corresponding substituted chlorazine.

*Example 8*

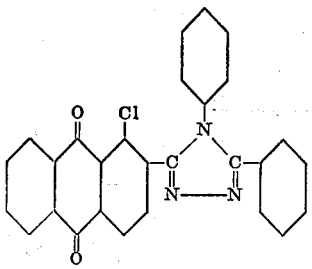

A mixture of 4 parts of the product of Example 7, 1.1 parts by volume of aniline and 20 parts by volume of dimethyl aniline is stirred at 170–175° C., until formation of the triazole is complete. The mixture is then digested in excess dilute hydrochloric acid and the product filtered and washed with water. The new triazole may be purified by crystallization from dilute acetic acid and then from pentasol. The triazole gives a brownish-red vat from which it is recovered unchanged on aeration. It can be converted to the amino compound, a red vat dye as described in my copending application, Serial No. 696,906, filed November 18, 1957.

*Example 9*

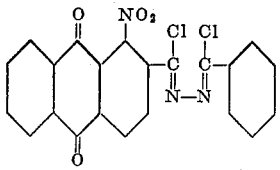

The procedure of Example 6 is followed using 1-nitroanthraquinone-2-carboxy chloride in equivalent amounts in place of the chloranthraquinone carboxy chloride. The resultant diacyl hydrazine is chlorinated by the procedure of Example 5 to give the above compound, which can be condensed with aniline, by the procedure of Example 8, to give a red vat dye.

I claim:
1. The process of preparing an anthraquinonyl chloroaldazine which comprises heating an unaminated, unhydroxylated 2-anthraquinonyl aldazine with a chlorinating agent in nitrobenzene at temperatures above 60° C.
2. The process of claim 1 in which the chlorinating agent is chlorine.
3. The process of claim 2 in which the anthraquinonyl aldazine is unsubstituted 2-anthraquinonyl aldazine.
4. The process of claim 2 in which the anthraquinonyl aldazine is 1-chloro-2-anthraquinonyl aldazine.
5. The process of preparing a diaryl dichloro aldazine which comprises heating an N,N'-diaroyl hydrazine, in which one of the aryl groups is an anthraquinonyl carbonyl radical, with phosphorus pentachloride above 100° C.
6. The process of claim 5 in which the starting material is N-2-anthraquinonyl carbonyl-N'-benzoyl hydrazine.
7. The process of claim 5 in which the starting material is N-1-chloroanthraquinonyl-2-carbonyl-N'-benzoyl hydrazine.
8. Chloroaldazines of the structure:

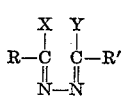

in which X and Y are selected from the group consisting of chlorine and hydrogen, at least one of X and Y being chlorine, and R and R' are aryl groups, at least one of which is a 2-anthraquinonyl radical.
9. The compound:
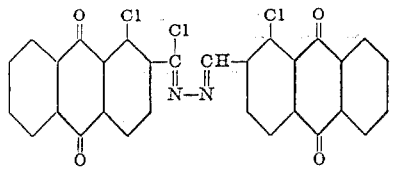
10. The compound:
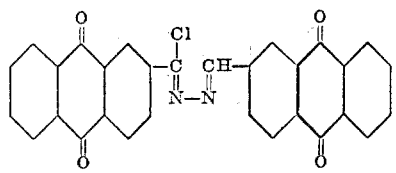
11. The compound:
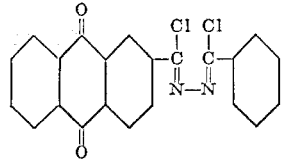
12. The compound:
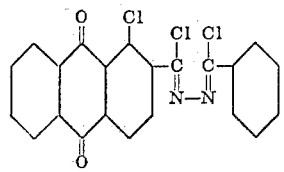
No references cited.